Jan. 9, 1962            O. F. ARTHUR            3,016,222
METHOD FOR FORMING A BONDED PALLET STRUCTURE AND
PALLET PRODUCED BY SAME
Filed May 28, 1959            3 Sheets-Sheet 1
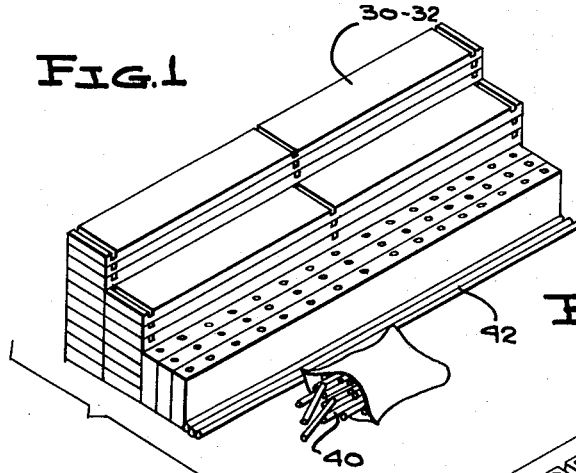
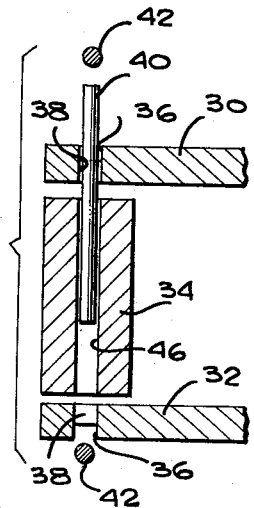
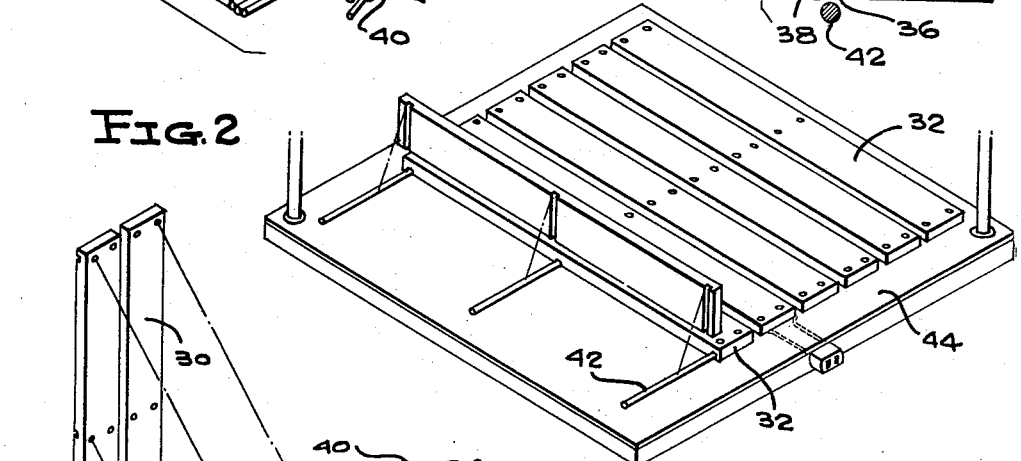
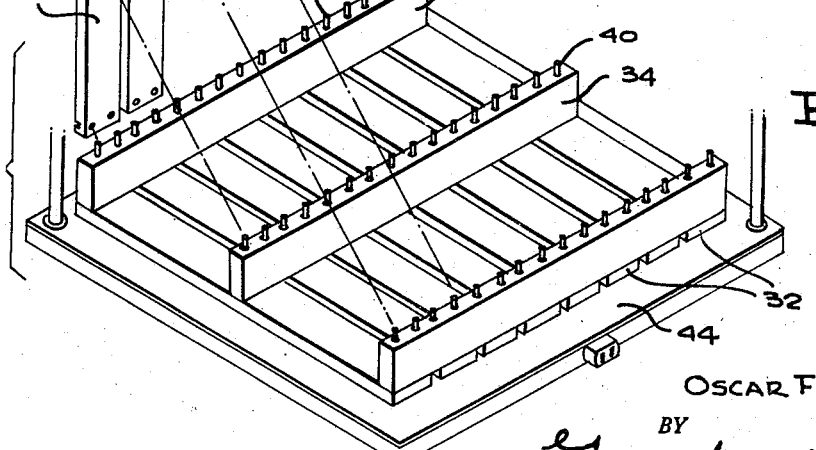
INVENTOR.
OSCAR F. ARTHUR
BY
ATTORNEY Jan. 9, 1962   O. F. ARTHUR   3,016,222
METHOD FOR FORMING A BONDED PALLET STRUCTURE AND
PALLET PRODUCED BY SAME
Filed May 28, 1959   3 Sheets-Sheet 2
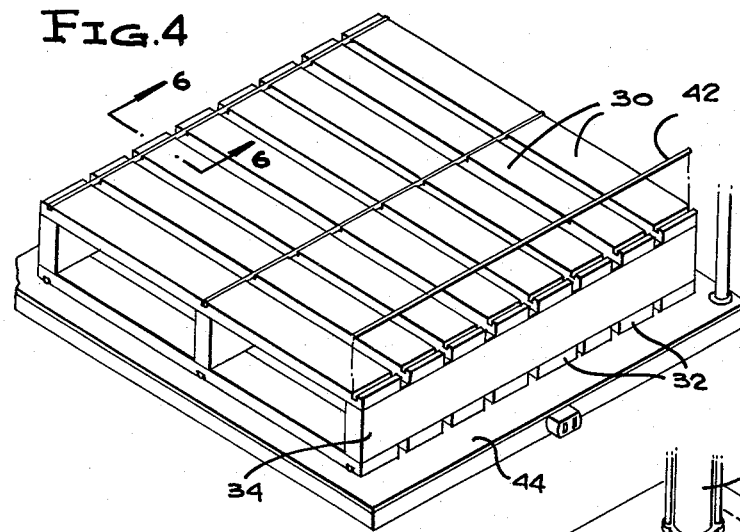
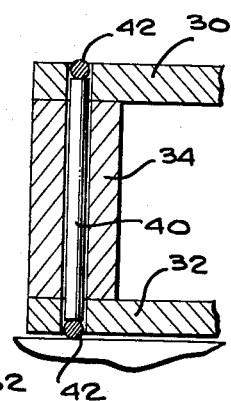
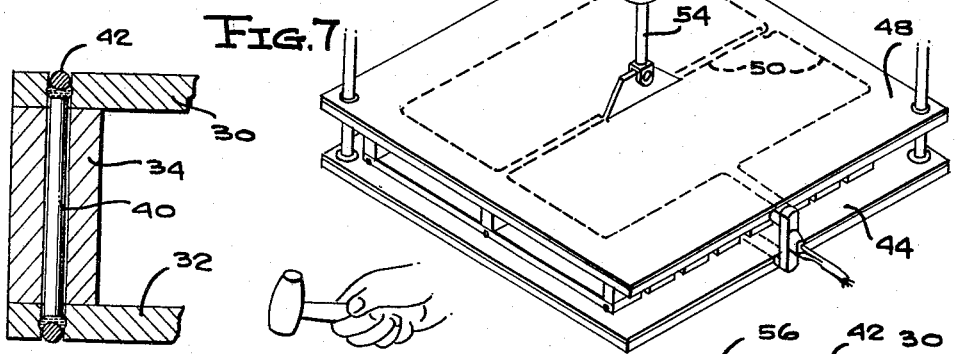
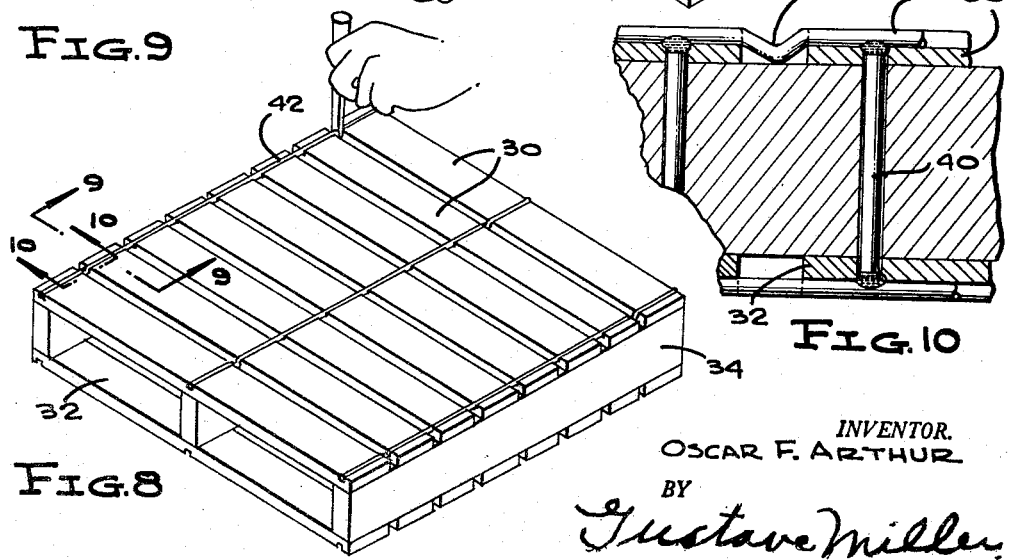
INVENTOR.
OSCAR F. ARTHUR
BY
Gustave Miller
ATTORNEY

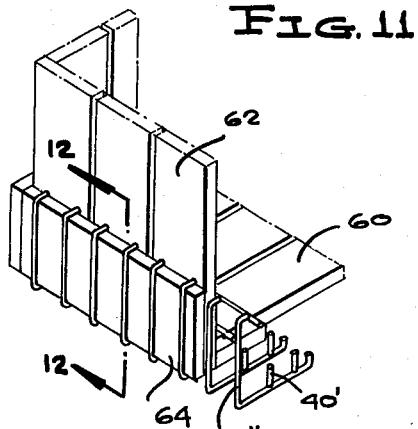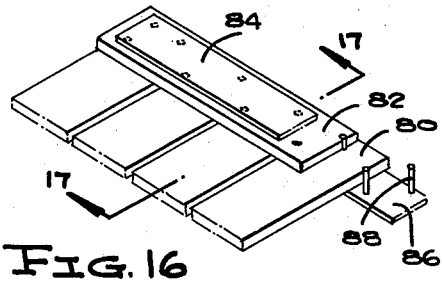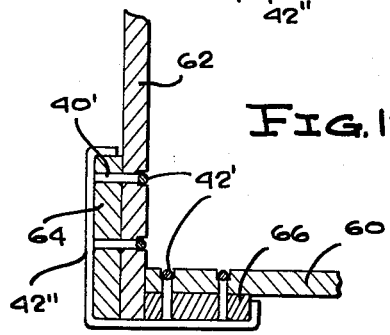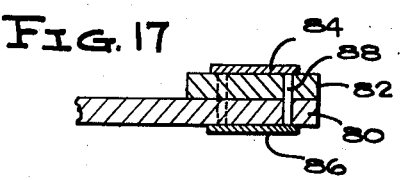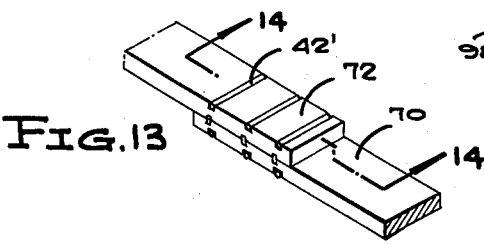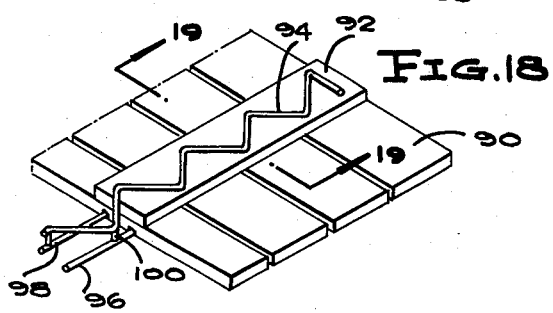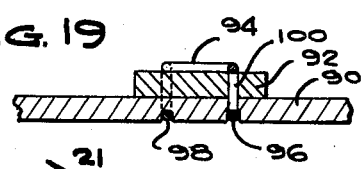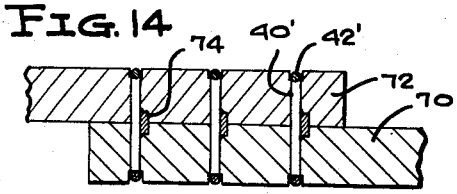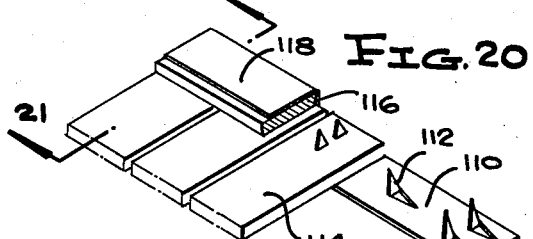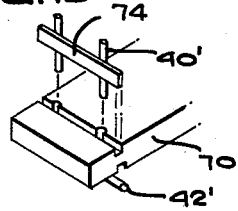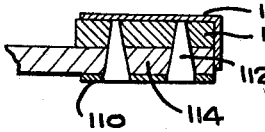

United States Patent Office 3,016,222
Patented Jan. 9, 1962

3,016,222
METHOD FOR FORMING A BONDED PALLET STRUCTURE AND PALLET PRODUCED BY SAME
Oscar F. Arthur, 220 Forest Glen Road, Silver Spring, Md.
Filed May 28, 1959, Ser. No. 816,495
2 Claims. (Cl. 248—120)

The present invention relates to pallets generally and in particular to a method for forming a bonded pallet structure and to the pallet produced by the method.

Presently in use are pallet structures for the support and transport of articles of various weights and sizes. Such pallets as are in use are frequently constructed with wooden slats and boards on their upper and lower surfaces with suitable joinder members securing the upper slats to the lower slats, the joinder members being spaced apart to provide an access opening for the insertion thereinto and withdrawal therefrom of the fork of a lift truck, or other implement for raising or transporting the pallet. Due to wear and shrinking of the wood slats or boards, such pallets are of use for a relatively short period of time.

Frequently, the maintenance of the pallets in order to prolong their usefulness is a matter of an expense in excess of or equal to the cost of a new pallet.

An object of the present invention is to provide a method of constructing a pallet structure which is efficient and economically feasible.

Another object of the present invention is to provide a method of constructing a pallet without the use of bolts, screws, or nails.

A further object of the present invention is to provide a method of joining or securing together two or more spaced members in a pallet structure or any other structure, the members being arranged in face-to-face confronting relation and either spaced apart or abutting, with fusible means including fusible binding elements and connectors extending between the members and elements and permanently welded together.

A still further object of the present invention is to provide a pallet structure having long life characteristics, one simple in structure, one sturdy in construction, one which may be manufactured at reasonable cost on currently available machines, and one which, when constructed with slats or boards of relatively soft wood, may be tightened when the boards or slats shrink due to the nature of the wood from which they are fabricated.

These and other objects and advantages of the present invention will be fully apparent from the following description when taken in conjunction with the annexed drawings, in which:

FIGURE 1 is an isometric view of a plurality of slats or boards for forming the spaced members of the pallet structure according to the method of the present invention, binding elements and connectors also being shown.

FIG. 2 is an isometric view showing the first step in assembling the slats or members with the binding elements.

FIG. 3 shows a further step in isometric form showing the assembly of the connectors with the slats and joinder members.

FIG. 4 is an isometric view of the pallet structure in assembled form prior to welding.

FIG. 5 is an exploded view partially in section showing the step of inserting the connector in the members and joinder member.

FIG. 6 is a view on an enlarged scale, taken on the line 6—6 of FIG. 4.

FIG. 7 is an isometric view showing a further step in forming the pallet structure, using the method of the present invention.

FIG. 8 is an isometric view showing a final or additional step in the method of forming the pallet structure according to the present invention.

FIG. 9 is a view on an enlarged scale taken on the line 9—9 of FIG. 8.

FIG. 10 is a view on an enlarged scale, taken on the line 10—10 of FIG. 8.

FIG. 11 is an isometric view of a modified form of a structure constructed according to the method of the present invention.

FIG. 12 is a view on an enlarged scale, taken on the line 12—12 of FIG. 11.

FIG. 13 is an isometric view of another modified form of a structure formed by the method of the present invention.

FIG. 14 is a view on an enlarged scale, taken on the line 14—14 of FIG. 13.

FIG. 15 is an exploded view showing how the assembly of FIG. 13 is assembled.

FIG. 16 is an isometric view of a still further modified form of a structure constructed by the method of the present invention.

FIG. 17 is a view on an enlarged scale, taken on the line 17—17 of FIG. 16.

FIG. 18 is an isometric view of yet another structure constructed according to the method of the present invention.

FIG. 19 is a view taken on the line 19—19 of FIG. 18.

FIG. 20 is an isometric view of a still further modified form of a structure constructed according to the method of the present invention.

FIG. 21 is a view on an enlarged scale, taken on the line 21—21 of FIG. 20.

Referring in greater detail to the drawings, in which like numerals indicate like parts throughout the several views, the method of forming a structure according to the present invention comprises the steps of providing a plurality of slats or boards and arranging them in spaced confronting face-to-face relation as in FIGURE 5, one slat or board serving as a deck member 30 and another slat or board serving as a bottom member 32. The members 30 and 32 are arranged in spaced confronting face-to-face relation with a stringer or joinder member 34 interposed between the upper and lower members and abuttingly engaging the opposed faces of the members 30 and 32.

The remote or non-confronting face of each of the members 30 and 32 is provided with a transversely arranged groove 36 that serves as a positioning means.

An aperture 38 extends from the bottom of each of the grooves 36 to the confronting face of the adjacent member 30 or 32. The apertures 38 constitute other positioning means.

The next step consists in placing two connectors or dowels 40 fabricated of a fusible or weldable material through each deck slat and so that they extend from the non-confronting face of the member 30 to the non-confronting face of the opposite member 32.

The next step consists in positioning an elongated binding element 42 in each of the grooves 36 so that a part thereof abuts the adjacent end of the connector 40 and a portion extends in overlying relation with respect to the non-confronting face of the adjacent member 30 or 32. This is done most conveniently by first placing the binding elements 42 upon a surface 44 and positioning thereover the member 32 and then next placing the joinder members 34 in a position on the member 32 and inserting into the bores 46 provided in the joinder members 34 the connectors 40 so that one end of each connector 40 abuts the binding elements 42 on the surface 44. After this, the other members 30 are positioned so that the upper end portions of the connectors 40 extend into the apertures 38 and finally, the other binding elements 42 are laid in the grooves 36 of the member 30 so that they abut the upper ends of the connectors 40.

In the next step of the invention, the assembled members 30 and 32 with the connectors 40 and the binding elements 42 are positioned in a zone of an inductive heating of an intensity such as to bring to fusing or welding temperature the ends of the connectors 40 and the abutting portions of the binding elements 42, heating said assembly to fusing or welding temperatures and simultaneously applying a compressive force to the non-confronting faces of the members 30 and 32 and the adjacent binding elements 42 sufficient in compressive force to effect at least partial flowing, as in FIG. 9, of the ends of the connectors 40 into fused or welded relation with respect to the adjacent portions of the elements 42, and removing the assembled and welded members 30 and 32, connectors 40, and elements 42 from the zone of inductive heating. This step is shown in FIG. 7, in which another surface 48 forms, with the surface 44, the induction heating plates of an induction device having embedded therein suitable coils 50, as shown in dotted lines.

The plate or surface 48 is movable toward the surface 44 in response to actuation of a hydraulic cylinder assembly 52, the actuating arm 54 of which is coupled to the surface 48.

A final or additional step may be taken, as shown in FIG. 8, in which a portion of each binding element 42 between adjacent slats or boards is depressed, as at 56 in FIG. 10, between the adjacent members 30 and 32 so as to tighten the structure in case of shrinkage of the members 30 and 32.

Referring to FIGS. 11 and 12, a modified form of a structure is shown built by the method of the present invention, such structure being useful as a box, tank, vat, or other receptacle. The structure comprises base members 60 and members 62 rising from the perimeter of the base members 60. Another member 64 is positioned in confronting face-to-face relation with respect to the end portions of the members 60 and a member 66 is likewise positioned with respect to the ends of the base members 60. Binding elements 42' extend along grooves formed in the non-confronting faces of the base members 60 and members 62 and two dowel-like connectors 40' extend through each slat like base member 60 and member 66, and through each of the members 62 and 64 at adjacent longitudinally-spaced points on the binding elements. Other binding elements 42'' are exteriorly of the members 64 and 66 and abut against the adjacent ends of the connectors 40'. This modified form of the structure is assembled and secured together by welding as previously described with reference to the pallet structure shown in FIGS. 1 to 10.

Another structure is shown in FIGS. 13 and 14 and in FIG. 15 in which members 70 and 72 are arranged in confronting face-to-face relation and have binding elements 42' extending in grooves provided in the non-confronting faces of such members. To the connectors 40' in this embodiment of the invention are secured keys 74 welded to the mid lengths of the connectors 40' and received in suitably arranged grooves provided in the confronting faces of the members 70 and 72.

In FIGS. 16 and 17 a still further modified form of a structure constructed according to the method of the present invention is shown, in which members 80 and 82 are arranged in confronting face-to-face relation and a plate 84 is positioned so as to extend over the non-confronting face of the member 82. Another plate 86 extends over the non-confronting face of the member 80. Connectors 88 extend between the plates 84 and 86 and from the non-confronting face of the one member 80 to the non-confronting face of the member 82. This assembly is inductively heated so that the ends of the connectors 88 are welded to the adjacent portions of the plates 84 and 86.

In FIGS. 18 and 19 is shown another structure constructed according to the method of the present invention in which members 90 and 92 are arranged in confronting face-to-face relation and a specially formed binding element 94 abuts the non-confronting face of the member 92 and other binding elements 96 and 98 are embedded in grooves provided in the non-confronting face of the member 90. The connectors 100 extend between the binding elements 94, 96 and 98 and are welded thereto. This structure is useful in reinforcing a mid portion of a panel, receptacle, pallet, or the like against splitting.

In FIG. 20 there is shown yet another structure constructed according to the method of the present invention, in which a plate-like element 110 is provided with upstanding portions forming connectors 112 that serve the function of the dowels 40 and each penetrating the lower member 114 and extending through the upper member 116 and into abutting engagement with a plate 118 arranged longitudinally of the member 116 and on the non-confronting face of the latter. This structure is formed by first inserting the connectors 112 through the members 114 and 116 and then capping the member 116 on the end and on the top with the plate 118 and then subjecting the assembled structure to inductive heating so as to cause the upper ends of the connectors 112 to weld or fuse with the member 118.

It will be seen, therefore, that the method of securing together a pair of members arranged in confronting face-to-face spaced relation may be employed to construct a pallet structure or other structure suitable in any number of forms such as vats, receptacles, bins, boxes, panels for building purposes and the like.

It is intended that not only are the connectors and binding elements to be fabricated of weldable material such as steel or the like, but they may also be fabricated of fusible material such as partially formed or unformed plastic. The members 30 and 32 may also be fabricated of materials other than wood, as may be the members 60, 62, 64, 66 and the members above decsribed with reference to the FIGS. 13 to 21 inclusive.

Having thus set forth and disclosed the nature of this invention, what is claimed is:

1. A pallet structure that comprises deck and bottom slats each having rows of holes that extend through them, stringers disposed crosswise of the slats, between the deck and the bottom and each having holes therethrough, in vertical alinement with adjacent rows of vertical holes through the deck and bottom, metallic binders of rod-like form disposed across the upper sides of the deck slats at the rows of holes and set into grooves formed crosswise in the slats, but their tops being not lower than the top surfaces of the slats, the stringers and the binders extending approximately the full width of the pallet, metallic binders disposed crosswise of the bottom slats, at the various rows of holes, and connector dowels in the various holes, in position to tie the upper slats and the lower slats together and bind them to the stringers, the ends of the dowels being welded to the binders.

2. Pallet structure as recited in claim 1, wherein the binders are of circular form in cross section and the dowels are welded to the inner side areas of the binders.

References Cited in the file of this patent

UNITED STATES PATENTS

| | | |
|---|---|---|
| 325,969 | Redding | Sept. 8, 1885 |
| 403,530 | Gedge | May 21, 1889 |
| 611,511 | Robinson | Sept. 22, 1898 |
| 800,577 | Hines | Sept. 26, 1905 |
| 2,029,123 | Stuck | Jan. 28, 1936 |

(Other references on following page)

UNITED STATES PATENTS

| | | | |
|---|---|---|---|
| 2,161,107 | Swingle | June 6, | 1939 |
| 2,327,924 | Mounts | Aug. 24, | 1943 |
| 2,503,022 | Benoist | April 4, | 1950 |
| 2,651,486 | Woodward | Sept. 8, | 1953 |
| 2,769,230 | Nystrom | Nov. 6, | 1956 |
| 2,783,960 | Herz | Mar. 5, | 1957 |
| 2,808,493 | Brennan | Oct. 1, | 1957 |
| 2,820,874 | Dunn | Jan. 21, | 1958 |
| 2,942,825 | Trapp | June 28, | 1960 |

FOREIGN PATENTS

| | | | |
|---|---|---|---|
| 1,154,475 | France | Nov. 4, | 1957 |
| 1,173,326 | France | Oct. 27, | 1958 |